(12) United States Patent
Yokouchi et al.

(10) Patent No.: US 11,381,186 B2
(45) Date of Patent: Jul. 5, 2022

(54) MOTOR DRIVE DEVICE, ELECTRIC OIL PUMP, AND METHOD FOR DETECTING FAILURE OF MOTOR DRIVE DEVICE

(71) Applicant: NIDEC CORPORATION, Kyoto (JP)

(72) Inventors: Hiroki Yokouchi, Kyoto (JP); Shuji Endo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/266,555

(22) PCT Filed: Aug. 7, 2019

(86) PCT No.: PCT/JP2019/031058
§ 371 (c)(1),
(2) Date: Feb. 5, 2021

(87) PCT Pub. No.: WO2020/032084
PCT Pub. Date: Feb. 13, 2020

(65) Prior Publication Data
US 2021/0297026 A1   Sep. 23, 2021

(30) Foreign Application Priority Data
Aug. 8, 2018  (JP) .............................. JP2018-149094

(51) Int. Cl.
*H02P 21/13* (2006.01)
*H02P 21/16* (2016.01)
(Continued)

(52) U.S. Cl.
CPC ............. *H02P 21/13* (2013.01); *F04B 17/03* (2013.01); *F04B 49/10* (2013.01); *H02P 21/16* (2016.02); *H02P 27/06* (2013.01)

(58) Field of Classification Search
CPC .......... H02P 27/00; H02P 21/14; H02P 21/18; H02P 21/24; H02P 23/07; H02P 23/12;
(Continued)

(56) References Cited

U.S. PATENT DOCUMENTS 7,036,892 B2   5/2006   Suzuki et al.
7,039,542 B2   5/2006   Fujii et al.
(Continued)

FOREIGN PATENT DOCUMENTS

JP    S61240870 A    10/1986
JP    2000116176 A    4/2000
(Continued)

OTHER PUBLICATIONS

International Search Report in PCT/JP2019/031058, dated Oct. 1, 2019. 4pp.

*Primary Examiner* — Said Bouziane
(74) *Attorney, Agent, or Firm* — Hauptman Ham, LLP

(57) ABSTRACT

Provided is a motor drive device including a motor having a rotor and a stator, an inverter electrically connected to the motor, and a control device for controlling the inverter. The control device includes: an impedance observer that estimates at least an amount of variation in impedance of the motor on the basis of a voltage command value, a current command value, and an actual current flowing between the inverter and the motor; a comparator that calculates a difference between the current command value and the actual current flowing between the inverter and the motor; and a failure detection unit that outputs a failure flag when the amount of variation in impedance exceeds or falls below a predetermined threshold, or when the difference calculated by the comparator exceeds or falls below a predetermined threshold.

12 Claims, 2 Drawing Sheets

(51) Int. Cl.
*F04B 17/03* (2006.01)
*F04B 49/10* (2006.01)
*H02P 27/06* (2006.01)

(58) Field of Classification Search
CPC .......... H02P 23/14; H02P 27/04; H02P 27/06;
H02P 29/00; H02P 6/06; H02P 6/08;
H02P 6/12; H02P 6/17; H02P 6/28; F04B
17/03
See application file for complete search history.

(56) References Cited

U.S. PATENT DOCUMENTS

| | | |
|---|---|---|
| 8,471,507 B2 | 6/2013 | Akaishi et al. |
| 9,203,332 B2 | 12/2015 | Yamada |
| 10,093,352 B2 | 10/2018 | Mori et al. |
| 10,259,492 B2 | 4/2019 | Kezobo et al. |
| 10,718,325 B2 | 7/2020 | Watanabe et al. |
| 2015/0372627 A1* | 12/2015 | Kim ........................ H02P 21/16 318/801 |

FOREIGN PATENT DOCUMENTS

| | | |
|---|---|---|
| JP | 2000253506 A | 9/2000 |
| JP | 1042050 B2 | 2/2008 |
| JP | 200989552 A | 4/2009 |
| JP | 2015163248 A | 9/2015 |

\* cited by examiner

MOTOR DRIVE DEVICE, ELECTRIC OIL PUMP, AND METHOD FOR DETECTING FAILURE OF MOTOR DRIVE DEVICE

CROSS-REFERENCE TO RELATED APPLICATIONS

This is the U.S. national stage of application No. PCT/JP2019/031058, filed on Aug. 7, 2019, and priority under 35 U.S.C. § 119(a) and 35 U.S.C. § 365(b) is claimed from Japanese Patent Application No. 2018-149094, filed on Aug. 8, 2018.

FIELD OF THE INVENTION

The present invention relates to a motor drive device, an electric oil pump, and a method for detecting a failure of a motor drive device.

BACKGROUND

In recent years, automobiles having an automatic driving function, electric automobiles, and the like are growing popular. In such vehicles, so-called electrification is progressing, and motors, electric pumps, and the like are used instead of hydraulic mechanisms.

An electric pump is mounted on a vehicle such as an automobile, and is used, for example, to circulate a refrigerant used for cooling an engine, a drive motor, or the like. An electric pump or the like may be required to have a redundant function for allowing a vehicle to travel even if it fails due to some factor. When a failure occurs, it is conceivable to detect the failure, disconnect the relevant part, and replace the function of the failed part with another element.

However, failure detection requires various sensors, which may lead to complicated structure and an increase in cost.

SUMMARY

A motor drive device according to an exemplary embodiment of the present invention includes a motor having a rotor and a stator, an inverter electrically connected to the motor, and a control device for controlling the inverter, wherein the control device includes: an impedance observer that estimates at least an amount of variation in impedance of the motor on the basis of a voltage command value, a current command value, and an actual current flowing between the inverter and the motor; a comparator that calculates the difference between the current command value and the actual current flowing between the inverter and the motor; and a failure detection unit that outputs a failure flag when the amount of variation in impedance exceeds or falls below a predetermined threshold, or when the difference calculated by the comparator exceeds or falls below a predetermined threshold.

A method for detecting a failure of a motor drive device according to an exemplary embodiment of the present invention includes: estimating, on the basis of a voltage command value, a current command value, and an actual current flowing between an inverter and a motor, at least an amount of variation in impedance of the motor by an impedance observer; calculating a difference between the current command value and the actual current flowing between the inverter and the motor by a comparator; and outputting, by a failure detection unit, a failure flag when the amount of variation in impedance exceeds or falls below a predetermined threshold, or when the difference calculated by the comparator exceeds or falls below a predetermined threshold.

The above and other elements, features, steps, characteristics and advantages of the present disclosure will become more apparent from the following detailed description of the preferred embodiments with reference to the attached drawings.

DETAILED DESCRIPTION

Motor control according to an embodiment of the present invention will be described below with reference to the accompanying drawings. Note that the scope of the present invention is not limited to the embodiment described below, but includes any modification thereof within the scope of the technical idea of the present invention.

Figure 1:
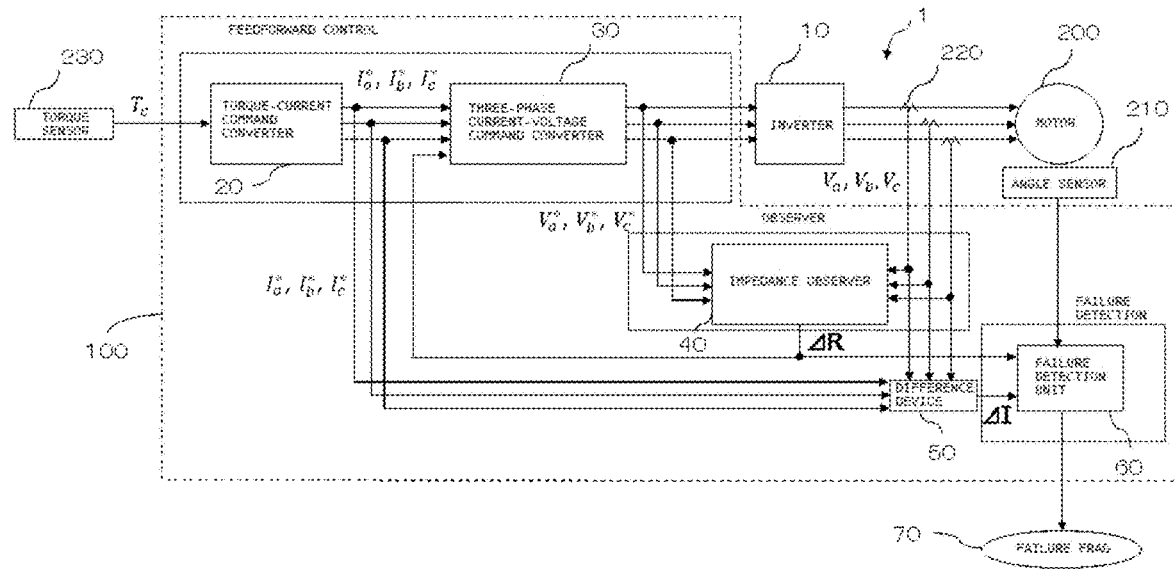
FIG. 1 is a block diagram showing a configuration of a control device according to the present embodiment.

FIG. 1 is an example of a block diagram showing the configuration of a control device 1. The control device 1 according to the embodiment of the present invention shown in FIG. 1 includes an inverter 10, a torque-current command converter 20, a three-phase current-voltage command converter 30, an impedance observer 40, a difference device 50, and a failure detection unit 60. The torque-current command converter 20, the three-phase current-voltage command converter 30, the impedance observer 40, the difference device 50, and the failure detection unit 60 are installed in a microcomputer 100 as a motor control device. Further, the microcomputer 100 outputs a signal for controlling the inverter 10 and controls the drive of a motor 200 on the basis of the signal.

In the present embodiment, the motor drive device includes the motor 200 and the control device 1. The motor 200 has a stator and a rotor that can rotate relative to the stator. The motor drive device according to the present embodiment is used, for example, in an electric oil pump. Note that the motor drive device may be used for applications other than the electric oil pump.

An angle sensor 210 is attached to the motor 200. The angle sensor 210 detects the rotation angle of the rotor. The angle sensor 210 may be, for example, a combination of a magnetoresistive element and a sensor magnet, or a Hall element (including a Hall IC). Note that the angle sensor may detect the rotation speed of the rotor instead of the rotation angle of the rotor.

The inverter 10 has a plurality of switching elements. The inverter 10 is electrically connected to the stator. In the inverter 10 in the present embodiment, a metal-oxide semiconductor field-effect transistor (MOSFET), an insulated gate bipolar transistor (IGBT), or the like is used, for example, as the switching element (field effect transistor (FET)). In the present embodiment, the motor 200 is a three-phase motor. Therefore, the inverter 10 in the present embodiment has six FETs.

A current sensor 220 is further connected to the inverter 10. In the present embodiment, one or more shunt resistors are used as the current sensor 220. In the present embodiment, a current is detected from one shunt resistor. Note that, as the current sensor 220, a so-called three-shunt resistor may be used, or a sensor other than the shunt resistor may be used.

A torque command value T* is given to the control device 1 as an input. The torque command value T* is obtained such that a torque detected by the torque sensor 230 is treated with a filter (not shown), and then, input as an assist torque.

The input torque command value T* is input to the torque-current command converter 20. The torque-current command converter 20 performs a process of integrating a torque constant as a gain for the torque command value T*, and converts the torque command value into three-phase current command values $I_a^*$, $I_b^*$, and $I_c^*$.

The current command value I* is output from the torque-current command converter 20 and input to the three-phase current-voltage command converter 30 as a signal. The three-phase current-voltage command converter 30 converts the current command value I* into a predetermined voltage command value V* by inverse conversion of the voltage equation. The voltage command value V* is output from the three-phase current-voltage command converter 30, converted to duty, and then input to the inverter 10 as a control signal. Further, the voltage command value V* is output from the three-phase current-voltage command converter 30 and also input to the impedance observer 40 as a signal.

The inverter 10 generates an ON/OFF control signal (PWM control) for each switching element in a predetermined switching pattern on the basis of the voltage command value V*, and applies a predetermined voltage and current to the motor 200.

An actual current I given from the inverter 10 to the motor 200 is detected by the abovementioned current sensor 220 for each of the three phases (U phase, V phase, W phase). The detected three-phase actual currents $I_a$, $I_b$, and $I_c$ are input to the impedance observer 40 as signals.

The impedance observer 40 can estimate an amount of variation ΔR in impedance in the motor drive device for each phase on the basis of the actual current I and the voltage command value V*. Here, the impedance observer 40 is, for example, a disturbance observer based on an inverse model of the control model of the motor in the present embodiment. However, the impedance observer 40 may be an observer other than the disturbance observer. Further, the impedance observer 40 can calculate an actual voltage V (actual three-phase voltage) by the following Equation 1 on the basis of the actual current I.

$$V = \left(R_{th} + \Delta R_{th} + L\frac{d}{dt}\right)I - EMF \quad \text{[Equation 1]}$$

In Equation 1, $R_{th}$ is an impedance of the motor, $\Delta R_{th}$ is an impedance error of the motor, and L is an inductance. EMF is a back electromotive force.

The amount of variation $\Delta R_{th}$ in impedance for each phase is fed back to the three-phase current-voltage command converter 30. The three-phase current-voltage command converter 30 outputs voltage command values $V_a^*$, $V_b^*$, and $V_c^*$ for each phase using the following Equation 2 on the basis of the fed-back amount of variation $\Delta R_{th}$ in impedance for each phase, the current command value I*, and the actual voltage V.

$$\begin{bmatrix} V_a^* \\ V_b^* \\ V_c^* \end{bmatrix} - \begin{bmatrix} V_a \\ V_b \\ V_c \end{bmatrix} = \begin{bmatrix} \Delta R_{tha} I_a^* \\ \Delta R_{thb} I_b^* \\ \Delta R_{thc} I_c^* \end{bmatrix} \quad \text{[Equation 2]}$$

$\Delta R_{tha}$, $\Delta R_{thb}$, and $\Delta R_{thc}$ shown in Equation 2 include an amount of variation in impedance due to temperature and an amount of variation due to failure. Meanwhile, in electric oil pumps, the temperature of oil, which is a refrigerant, is often measured. In that case, the measured oil temperature is the same as the motor coil temperature and the drive circuit temperature because of temperature equilibration. Therefore, it is desirable that values obtained by eliminating an amount of variation in impedance due to temperature using the measured oil temperature are used as $\Delta R_{tha}$, $\Delta R_{thb}$, and $\Delta R_{thc}$.

The actual current I detected by the current sensor 220 and the current command value I* output from the torque-current command converter 20 are input to the difference device 50. The difference device 50 calculates a difference ΔI between the actual current I and the current command value I*.

The difference ΔI between the actual current I and the current command value I* and the amount of variation ΔR in impedance are input to the failure detection unit 60 as signals. The failure detection unit 60 can determine failures (failure in duty, failure in the shunt resistor, failure in the FET of the inverter, failure in the angle sensor, failure in the motor structure, etc.) on the basis of the difference ΔI between the actual current I and the current command value I* and the amount of variation ΔR in impedance.

For example, a failure in duty, a failure in the shunt resistor, and a failure in the FET of the inverter can be determined using the amount of variation ΔR in impedance and the difference ΔI between the actual current I and the current command value I*. Regarding the failure in duty, the failure is determined by cumulatively adding the difference ΔI between the actual current I and the current command value I*. Further, the failure in the angle sensor can be determined on the basis of the difference ΔI between the actual current I and the current command value I*. A failure due to variation in impedance in the motor drive device can be determined on the basis of the amount of variation ΔR in impedance.

Furthermore, since the failure occurs independently for each electrical and electronic component, the ΔR generated due to the failure changes only in one of the $\Delta R_{tha}$, $\Delta R_{thb}$, and $\Delta R_{thc}$. Therefore, one phase showing a variation having a predetermined amount or more is extracted by majority vote, whereby the accuracy of failure detection can be improved.

Note that the failure detection unit 60 may determine the failure using not only the difference ΔI between the actual current I and the current command value I* and the amount of variation ΔR in impedance but also an output value of the angle sensor 210.

Further, in the present embodiment, the output of the torque-current command converter 20 and the output of the three-phase current-voltage command converter 30 are fed forward to the impedance observer 40, the difference device 50, and the like, respectively. That is, the torque-current command converter 20 and the three-phase current-voltage command converter 30 constitute a feedforward control system.

Figure 2:
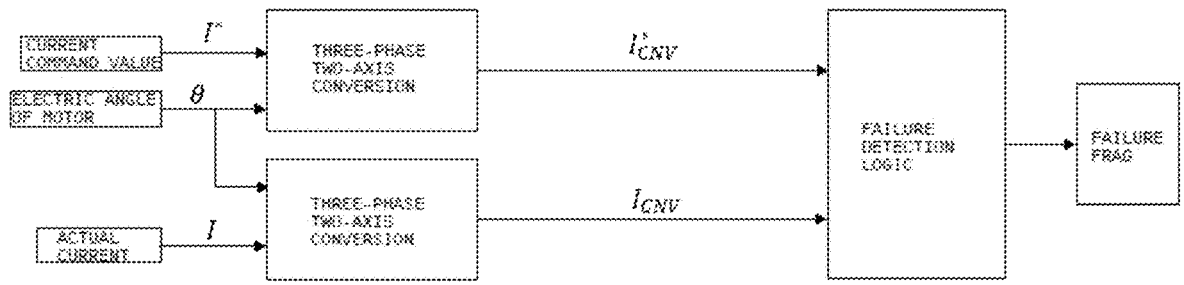
FIG. 2 is a block diagram showing a configuration of a failure detection system using a difference in current in the present embodiment.
Figure 3:
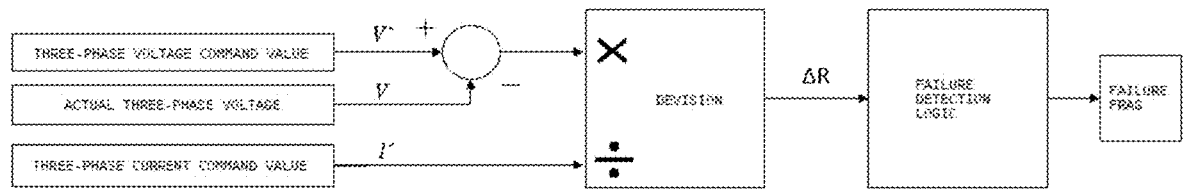
FIG. 3 is a block diagram showing a failure detection system using a difference in impedance in the present embodiment.

Next, a logic of failure detection using the difference ΔI between the actual current I and the current command value I* in the failure detection unit 60 will be described. FIG. 2 is a block diagram showing a configuration of a failure detection system using the difference ΔI between the actual current I and the current command value I*. First, three-phase two-axis conversion is performed for the actual current I and the current command value I* on the basis of the rotation angle (electric angle) of the rotor detected by the angle sensor 210. The two axes herein are so-called d-q synchronous coordinate systems. The magnetic flux (N pole) direction of a permanent magnet of the rotor is defined as a d-axis, and the direction 90 degrees forward from the d-axis in the positive direction at an angle θ is defined as a q-axis. The angle θ herein means what is represented by an electric angle.

As described above, the actual current I is detected by the current sensor 220 or the like. The detected actual current I is subjected to three-phase two-axis conversion on the basis of the rotation angle (electric angle) of the rotor detected by the angle sensor 210.

The value of actual current $I_{CNV}$ and the current command value $I_{CNV}^*$ which have been subjected to three-phase two-axis conversion are compared, and a failure is determined on the basis of the comparison result. When it is determined that there is a failure, the failure detection unit 60 outputs a failure flag 70 (signal). For example, the failure detection unit 60 calculates the difference ΔI between the value of the actual current I and the current command value I* which have been subjected to three-phase two-axis conversion for each of the d-axis and the q-axis. Subsequently, the difference value $ΔI_T$ which is a target value of ΔI and the actual difference value $ΔI_A$ are obtained for each of the d-axis and the q-axis. Then, the difference between $ΔI_T$ and $ΔI_A$ of each axis is added. When the added value with the above method exceeds (or falls below) a predetermined threshold, it is determined that a failure occurs. The control device 1 stops the drive of the motor 200, for example, on the basis of the failure flag 70 output from the failure detection unit 60.

Failure detection of the angle sensor 210 will be described as an example of failure detection using the difference ΔI in current between the actual current I and the current command value I*.

When the angle sensor 210 fails, control including the feedforward control described above is performed on the basis of the rotor position information output from the failed angle sensor 210. In this case, there is a difference in current value between the actual current I when there is no failure and an actual current $I_B$ when there is a failure. The difference ΔI is calculated for each of the d-axis and q-axis on the basis of the actual current I and the current command value I*. The difference value $ΔI_T$ which is a target value of ΔI and the actual difference value $ΔI_A$ are obtained for each of the d-axis and q-axis, and when a value obtained by adding the difference between $ΔI_T$ and $ΔI_A$ of each axis exceeds (or falls below) a predetermined threshold, it is determined that a failure occurs in the angle sensor, and a failure flag is output.

Figure 4:
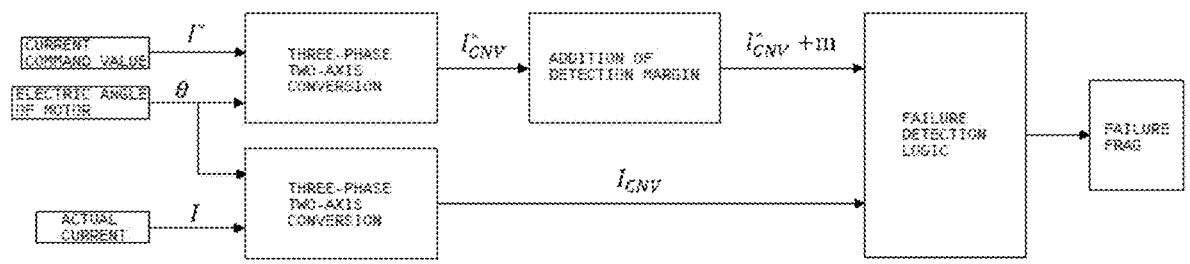
FIG. 4 is a block diagram showing a configuration of a control system according to a modification of the present embodiment.

As shown in FIG. 4, a detection margin m may be added to the current command value $I_{CNV}^*$ (indicated current) that has been subjected to three-phase two-axis conversion, the actual current $I_{CNV}$ that has been subjected to three-phase two-axis conversion and the current command value added with the detection margin m ($I_{CNV}^*$+m) may be compared, and a failure of the angle sensor may be determined on the basis of the comparison result. The threshold can be made variable by using the detection margin m.

The difference value $ΔI_T$, which is a target value of ΔI, and the actual difference value $ΔI_A$ vary depending on the magnitude of the disturbance factor. The detection margin is used to vary a failure determination threshold in order to prevent false detection or detection failure due to changes in disturbance factors. Disturbance factors include power supply voltage, motor rotation speed, target torque, motor winding temperature, etc.

Next, a logic of failure detection using ΔR in the failure detection unit 60 will be described.

The impedance observer 40 calculates the difference between the three-phase voltage command values $V_a^*$, $V_b^*$, and $V_c^*$ and the actual three-phase voltages $V_a$, $V_b$, and $V_c$. The amount of variation ΔR in impedance is obtained by dividing the voltage difference ΔV by the current command value I* in Equation 2 on the basis of the differences between the three-phase voltage command values $V_a^*$, $V_b^*$, and $V_c^*$ and the actual three-phase voltages $V_a$, $V_b$, and $V_c$, and the three-phase current command values $I_a^*$, $I_b^*$, and $I_c^*$.

The calculated amount of variation ΔR in impedance is compared to a predetermined threshold, and a failure determination is performed on the basis of the comparison result. The failure detection unit 60 outputs the failure flag 70 (signal) when it is determined that a failure has occurred.

Impedance failure will be described as an example of failure determination using the amount of variation ΔR in impedance.

The stator includes a plurality of coils. Examples of impedance failures include disconnection of windings constituting the coil and deformation of a bus bar connected to the coil.

When such an impedance failure occurs, a difference between an impedance when there is no failure and an impedance when there is a failure, that is, an amount of variation ΔR in impedance, occurs. When the amount of variation ΔR in impedance exceeds (or falls below) a predetermined threshold, the failure detection unit 60 determines that a failure has occurred in the impedance, and outputs the failure flag 70.

In the abovementioned failure determination, only one of the difference ΔI between the actual current I and the current command value I* and the amount of variation ΔR in impedance is used. However, a failure of the motor drive device may be determined using both the difference ΔI in current between the actual current I and the current command value I* and the amount of variation ΔR in impedance.

For example, in a case where: there is an abnormality in the duty that is a control signal of the inverter 10; the current sensor has a failure; or the switching element (FET, etc.) of the inverter 10 has a failure, the actual current I, the actual voltage V, and the impedance R vary, compared to the case where there are no failures, and therefore, the difference ΔI between the actual current I and the current command value I* and the amount of variation ΔR in impedance both vary.

Therefore, when the difference ΔI between the actual current I and the current command value I* exceeds (or falls below) the predetermined threshold, and when the amount of variation ΔR in impedance exceeds (or falls below) the predetermined threshold, at least one of the cases where there is an abnormality in the duty that is the control signal of the inverter 10, the current sensor 220 has a failure, and the switching element (FET, etc.) of the inverter 10 has a failure occurs. That is, the failure detection unit 60 can determine these failures on the basis of both the current difference ΔI between the actual current I and the current command value I* and the amount of variation ΔR in impedance, and output the failure flag.

In other words, the failure detection unit 60 can determine an abnormality in the duty, a failure in the current sensor, a failure in the switching element, a failure in the angle sensor, and a failure in impedance on the basis of at least one of the current difference ΔI between the actual current I and the current command value I* and the amount of variation ΔR in impedance.

The embodiment described above relates to motor control. However, the present invention may be used for electric power steering, electric pumps, other actuators, etc. that use the motor.

The features described in the present specification can be combined as appropriate as long as they are inconsistent with each other.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor drive device comprising:
a motor having a rotor and a stator;
an inverter electrically connected to the motor; and
a control device for controlling the inverter, wherein
the control device includes: an impedance observer that estimates at least an amount of variation in impedance of the motor on the basis of a voltage command value, a current command value, and an actual current flowing between the inverter and the motor; a comparator that calculates a difference between the current command value and the actual current flowing between the inverter and the motor; and a failure detection unit that outputs a failure flag when the amount of variation in impedance exceeds or falls below a predetermined threshold, or when the difference calculated by the comparator exceeds or falls below a predetermined threshold.

2. The motor drive device according to claim 1, wherein the amount of variation in impedance is caused by a failure that occurs in the stator, and the failure detection unit outputs the failure flag.

3. The motor drive device according to claim 1, wherein the impedance observer performs a process of eliminating the amount of variation in impedance due to temperature from the estimated amount of variation in impedance.

4. The motor drive device according to claim 1, wherein the impedance observer identifies a failed phase by majority vote.

5. The motor drive device according to claim 1, wherein the motor has an angle sensor that detects a rotational position of the rotor and outputs position information of the rotor, and the comparator performs three-phase two-axis conversion on the actual current on the basis of the position information, and performs three-phase two-axis conversion on the current command value on the basis of the position information.

6. The motor drive device according to claim 5, wherein the difference is caused by a failure of the angle sensor.

7. The motor drive device according to claim 5, wherein the comparator adds a detection margin in the three-phase two-axis conversion for the actual current.

8. The motor drive device according to claim 7, wherein the failure detection unit determines, on the basis of the amount of variation in impedance and the difference, an abnormality in duty that is a signal for controlling the inverter, and outputs the failure flag.

9. The motor drive device according to claim 1, wherein the motor further has a current sensor that detects the actual current flowing through the motor, and
the failure detection unit determines a failure of the current sensor on the basis of the amount of variation in impedance and difference, and outputs the failure flag.

10. The motor drive device according to claim 9, wherein the inverter has a plurality of switching elements, and the failure detection unit determines a failure of the switching element on the basis of the amount of variation in impedance and the difference, and outputs the failure flag.

11. An electric oil pump comprising the motor drive device according to claim 1.

12. A method for detecting a failure of a motor drive device, the method comprising:
estimating, on the basis of a voltage command value, a current command value, and an actual current flowing between an inverter and a motor, at least an amount of variation in impedance of the motor by an impedance observer;
calculating a difference between the current command value and the actual current flowing between the inverter and the motor by a comparator; and
outputting, by a failure detection unit, a failure flag when the amount of variation in impedance exceeds or falls below a predetermined threshold, or when the difference calculated by the comparator exceeds or falls below a predetermined threshold.

* * * * *